United States Patent
Bogacz et al.

(10) Patent No.: US 11,263,804 B1
(45) Date of Patent: Mar. 1, 2022

(54) SYSTEMS AND METHODS FOR EFFICIENT POINT CLOUD VISUALIZATION BASED ON A HYBRID RENDERING OF DATA POINTS AND MESHES

(71) Applicant: Illuscio, Inc., Culver City, CA (US)

(72) Inventors: Joseph Bogacz, Perth (CA); Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/473,621

(22) Filed: Sep. 13, 2021

(51) Int. Cl.
*G06T 15/20* (2011.01)
*G06T 7/70* (2017.01)

(52) U.S. Cl.
CPC ............... *G06T 15/20* (2013.01); *G06T 7/70* (2017.01)

(58) Field of Classification Search
None
See application file for complete search history.

(56) References Cited

U.S. PATENT DOCUMENTS

| | | | |
|---|---|---|---|
| 2010/0239186 A1* | 9/2010 | Fowler | G06T 15/40 382/291 |
| 2010/0309205 A1* | 12/2010 | Novosad | G06T 15/06 345/426 |
| 2016/0253838 A1* | 9/2016 | Nguyen | G06T 15/08 345/422 |

* cited by examiner

*Primary Examiner* — Frank S Chen
(74) *Attorney, Agent, or Firm* — Ansari Katiraei LLP; Arman Katiraei; Sadiq Ansari

(57) ABSTRACT

Disclosed is a system and method for rendering point clouds via a hybrid data point and construct visualization. The system receives a point cloud of a three-dimensional ("3D") environment, and differentiates a first set of the point cloud data points from a second set of the data points based on a position of each data point relative to a specified render position. The system generates a first visualization from values of each of the first set of data points, and a second visualization from values of a set of constructs that replace the second set of data points. Each construct has a polygonal shape and a singular set of values defined from the values of two or more of the second set of data points. The system presents a final render of the 3D environment from the render position by combining the first visualization with the second visualization.

20 Claims, 9 Drawing Sheets

SYSTEMS AND METHODS FOR EFFICIENT POINT CLOUD VISUALIZATION BASED ON A HYBRID RENDERING OF DATA POINTS AND MESHES

BACKGROUND

A point cloud may have millions or billions of data points with each data point capturing the positioning and other characteristics of a corresponding point of a three-dimensional ("3D") object or environment. Rendering the point cloud data points may produce a visualization that is more detailed and/or more accurate than a rendering of the same 3D object or environment using polygons, voxels and/or meshes. For instance, each polygon, voxel, and/or mesh may approximate the detail, coloring, and/or other visual characteristics within a region of the 3D object or environment, whereas the point cloud may use multiple data points to more granularly and accurately define the detail, coloring and/or other visual characteristics at specific points within that same region.

However, rendering millions or billions of data points or editing a visualization produced from such a large point cloud dataset may impose significantly greater resource overhead and computational effort on the rendering system or device than when producing a lower detailed and lower resolution visualization with polygons, voxels, and/or meshes. In some cases, the rendering system or device may not have sufficient resources to process, render, or efficiently interact with large point clouds.

DETAILED DESCRIPTION OF PREFERRED EMBODIMENTS

Figure 1:
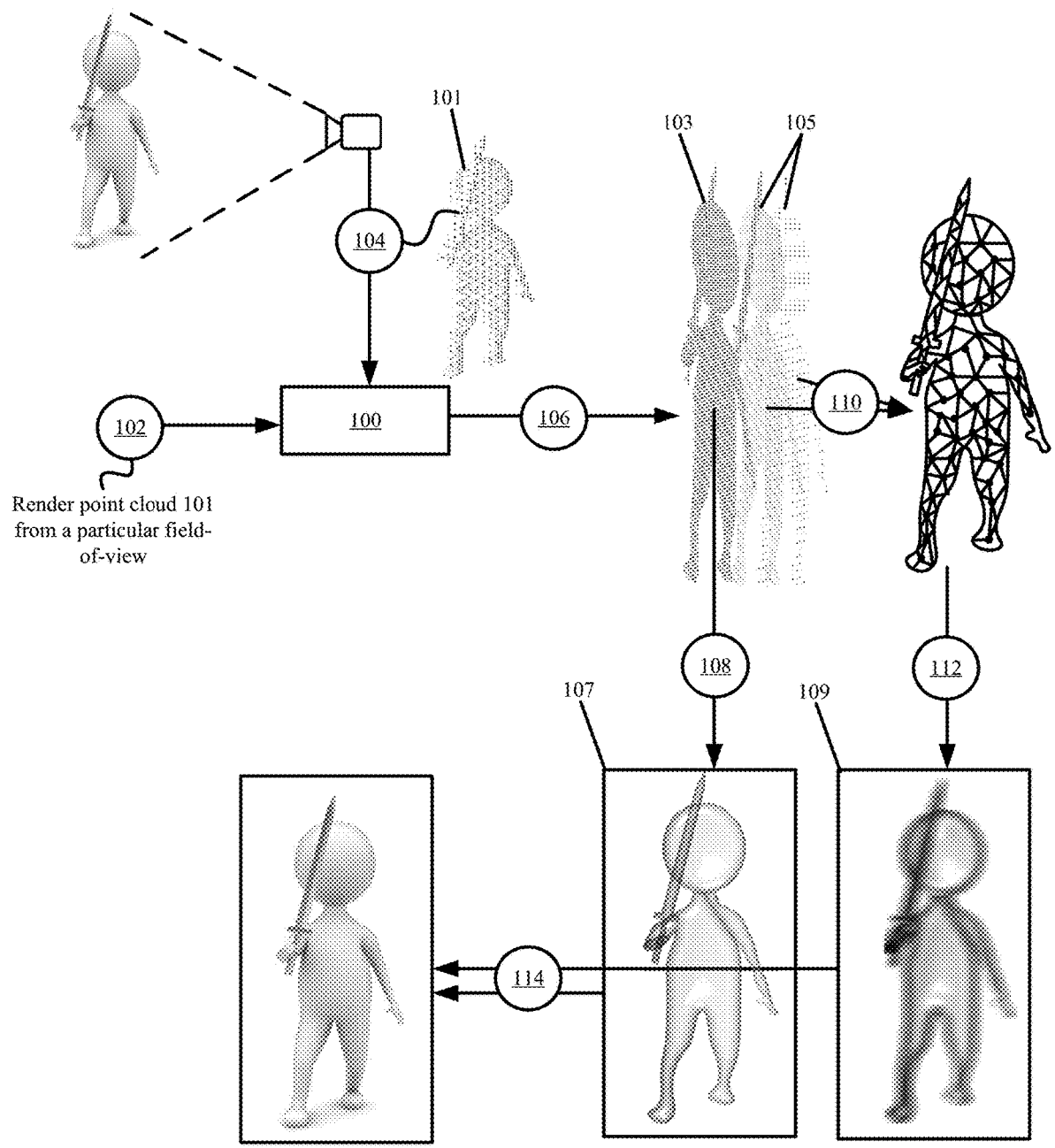
FIG. 1 illustrates an example for hybrid rendering of a point cloud in accordance with some embodiments presented herein.

The following detailed description refers to the accompanying drawings. The same reference numbers in different drawings may identify the same or similar elements.

Provided are systems and methods for efficiently rendering point clouds without loss of detail or accuracy by using a hybrid data point and mesh visualization. To preserve the detail or accuracy afforded by the point cloud data points when producing the point cloud visualization, the hybrid rendering disclosed herein may include rendering individual data points from a first set of the point cloud data points that are positioned within a rendering field-of-view and that are not wholly obscured by the visualization of one or more other data points. To increase efficiency while reducing resource overhead and computational effort when producing the point cloud visualization, the hybrid rendering may further include defining and rendering constructs that encompass two or more data points, such as meshes, voxels, and/or polygons, for a second set of the point cloud data points that are outside the rendering field-of-view and/or that are wholly obscured by the visualization of the first set of data points.

The rendering of the non-visible regions with the meshes, voxels, polygons, and/or other constructs may be performed in order to produce a complete visualization of a three-dimensional ("3D") object or environment represented by the point cloud more efficiently than when rendering all data points of the point cloud, and in order to present a visualization, rather than blank or empty space, in the event user interactions shift the non-visible regions into the field-of-view. Moreover, the rendering of the non-visible regions with the meshes, voxels, and/or polygons may be performed in order to further increase the accuracy of the rendered first set of data points that are in the field-of-view. Specifically, the non-visible regions, that are rendered using the meshes, voxels, or polygons instead of the second set of data points, may contribute reflections, coloring, lighting, and/or other visual effects on the visible regions that are rendered using the first set of data points. Thus, the mesh-rendered surfaces (e.g., the surfaces or features that are rendered from meshes, voxels, and/or polygons) in the non-visible regions may be used to accurately calculate the reflections, coloring, lighting, and/or other effects that may impact the final rendering of the data point-rendered surfaces in the visible regions.

In some embodiments, the hybrid rendering may include inspecting positioning of the point cloud data points relative to a render position or a position of a virtual camera from which the point cloud data points are to be rendered, performing a detailed and accurate first rendering of a first set of data points within a visible first region of the point cloud, and performing a low detail and fast second rendering for a second set of data points within a non-visible second region of the point cloud. Performing the first rendering may include rendering a different point in the visualization based on positioning, coloring, and/or other characteristics of a corresponding data point in the first set of data points. Performing the second rendering may include defining meshes, voxels, and/or polygons to represent different subsets of the second set of data points, and using the positioning, coloring, and/or other characteristics defined for the meshes, voxels, and/or polygons to render the non-visible second region of the point cloud with less accuracy and detail than when rendering the same non-visible second region based on the positioning, coloring, and/or other characteristics for each individual data point of the second set of data points.

A point cloud differs from a pixelated or voxelated image or representation of a 3D object or environment. The point cloud may include several data points (e.g., thousands, millions, billions, etc.) that correspond to and capture the positional and non-positional information for different points of the 3D object or environment.

The point cloud and the individual data points of the point cloud may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. The point cloud may be generated from output of two or more devices. For instance, a first imaging device (e.g., a LiDAR sensor) may determine the position for each data point in 3D space, and a second imaging device (e.g., a high-resolution camera) may measure or capture the visual characteristics or other non-positional information for each data point.

The point cloud data points may differ from pixels of a two-dimensional ("2D") image, because certain regions of the point cloud may have no data points, lower densities of data points, and/or higher densities of data points based on varying amounts of information that are detected at those regions when imaging a 3D object, volumetric object, or 3D environment. For instance, a point cloud imaging device may capture an object closer to the point cloud imaging device with more data points (e.g., a higher resolution) than if the same object was placed further away from the point cloud imaging device because a greater number of emitted beams (e.g., light, laser, etc.) from the device make contact with the closer object than the farther object and with measurements from each beam resulting in a different data point of point cloud. In contrast, pixels of a 2D image have a uniform density and a fixed arrangement defined by the resolution of the 2D image. Moreover, the point cloud data points may have a non-uniform placement or positioning in 3D space, whereas the 2D image has pixel data for each pixel of a defined resolution (e.g., 640×480, 800×600, etc.).

Each point cloud data point may include positional and non-positional data values. The positional data values may include coordinates within 3D space. For instance, each point cloud data point may include x-coordinate, y-coordinate, and z-coordinate values for each imaged point, feature, surface, or element of the 3D object or environment. The non-positional data point values may include values for descriptive characteristics of the data point. The descriptive properties of a data point may define one or more properties of a point, element, feature, or surface from the 3D object or environment that is captured or represented by that data point. More specifically, the descriptive characteristics may include the visual characteristics of the represented point, element, feature, or surface. The visual characteristics may correspond to a detected color. The color may be represented using red, green, blue ("RGB"), and/or other color values. In some embodiments, the descriptive characteristics may include the chrominance and/or luminance of the imaged point, element, feature, or surface. In some other embodiments, the descriptive characteristics may include properties of the imaging device used to capture the 3D environment. For instance, the descriptive characteristics may include a Tesla strength value to quantify the strength of the magnetic field that was used in detecting and/or imaging a particular point of the 3D environment. In some embodiments, the descriptive characteristics may include energy, audible or sound, and/or other characteristics of the imaging device or the object being imaged. In some embodiments, the descriptive characteristics may include material properties of the imaged point, element, feature, or surface. The material properties may be used to calculate the physics that result when an object makes contact with the imaged point, element, feature, or surface. The material properties may specify the magnetism, strength, softness or hardness, viscosity, stickiness, and/or weight for the imaged point, element, feature, or surface. Accordingly, the non-positional data values may include any property or descriptive characteristic of the imaged object part (e.g., hue, saturation, brightness, reflectivity, etc.) or of the imaging device used to capture the object part at a corresponding data point in 3D space.

The positional and non-positional data values for each particular data point may be stored in an array, and may be associated with that particular data point using an identifier or one or more of the data values. For instance, a particular data point may be identified with its x-coordinate, y-coordinate, and z-coordinate values, and the non-positional values, such as the red, green, blue, chrominance, luminance, tesla, and/or other values, for that particular data point may be accessed via a lookup of the x-coordinate, y-coordinate, and z-coordinate values.

FIG. 1 illustrates an example for hybrid rendering of a point cloud in accordance with some embodiments presented herein. FIG. 1 may include hybrid rendering system 100 for generating a complete 3D visualization of the 3D environment represented by point cloud 101 based on a hybrid rendering of point cloud 101.

Hybrid rendering system 100 may receive (at 102) an instruction to render point cloud 101. The instruction may be issued as application call, system call, Application Programming Interface ("API") call, and/or other input. The instruction may specify a position from which to render point cloud 101 and/or other properties for the visualization (e.g., focal depth, size of the field-of-view, etc.).

Hybrid rendering system 100 may retrieve (at 104) point cloud 101. Point cloud 101 may be stored in one or more files, data structures, and/or other datasets, and may be retrieved (at 104) over a network, from local storage, or elsewhere.

Hybrid rendering system 100 may inspect (at 106) the data point positional values in order to differentiate first set of the data points 103, that are within a visible region of point cloud 101 (e.g., within the rendering field-of-view and are not wholly obscured from the render position or camera by one or more other data points), from second set of the data points 105 that are within a non-visible region of point cloud 101 (e.g., outside the rendering field-of-view or are wholly obscured from the render position or camera by one or more other data points).

Hybrid rendering system 100 may render (at 108) each individual data point from first set of data points 103 classified as a visible data point. Rendering (at 108) an individual data point may include generating a point with a position in 3D space that is defined according to the positional values of the individual data point, and defining visual characteristics, such as the coloring, luminance, and/or chrominance, material properties, and/or other characteristics for that point based on the non-positional values of the individual data point. Accordingly, hybrid rendering system 100 evaluates and produces a first visualization 107 for each data point of first set of data points 103 based on the positional and non-positional values of each of those data points.

Hybrid rendering system 100 may efficiently produce second visualization 109 for the non-visible regions of point cloud 101 by defining (at 110) a different mesh, voxel, polygon, and/or another form or construct to represent different subsets of two or more of second set of data points 105, and by rendering (at 112) the meshes, voxels, polygons, and/or other forms or constructs in place of second set of data points 105 to generate second visualization 109. The meshes, polygons, voxels, and constructs may preserve the overall shape and visual characteristics captured by second set of data points 105 albeit with less detail, color accuracy, and/or other descriptive characteristic accuracy than second set of data points 105. Specifically, each construct may encompass the region or volume covered by two or more of second set of data points 105, and may include a single set of values to represent the distinct set of non-positional values associated with each of the two or more data points. Consequently, rendering (at 112) the meshes, voxels, polygons, or constructs takes less time and consumes fewer memory, processor, and/or other compute resources than rendering each data point of second set of data points 105. Second visualization 109 may have less fine detail and less color accuracy than first visualization 107, and may make up parts of the 3D object or environment that are hidden from the camera's field-of-view. Nevertheless, the rendered meshes, voxels, or polygons may recreate the hidden surfaces that cast reflections, that cast shadows, or that have reflectivity, coloring, lighting, and/or other properties that may affect the reflectivity, lighting, coloring, and/or other properties of other points or surfaces that fall within the camera's field-of-view.

Hybrid rendering system 100 may generate (at 114) the final render or complete visualization of point cloud 101 by combining first visualization 107 and second visualization 109, and/or by lighting or adding other visual effects based on reflective properties, coloring, specular highlights, and/or other characteristics of the rendered first set of data points 103 interacting with the corresponding properties and/or characteristics of the meshes, voxels, or polygons rendered instead of second set of data points 105. The final render accurately recreates the 3D object or environment captured by point cloud 101 because the visible surfaces are rendered with the high detail and color accuracy afforded by individual data points (e.g., first set of data points 103), whereas the hidden or non-visible surfaces are rendered with the lower detail and less color accuracy afforded by the meshes, voxels, or polygons.

Figure 2:
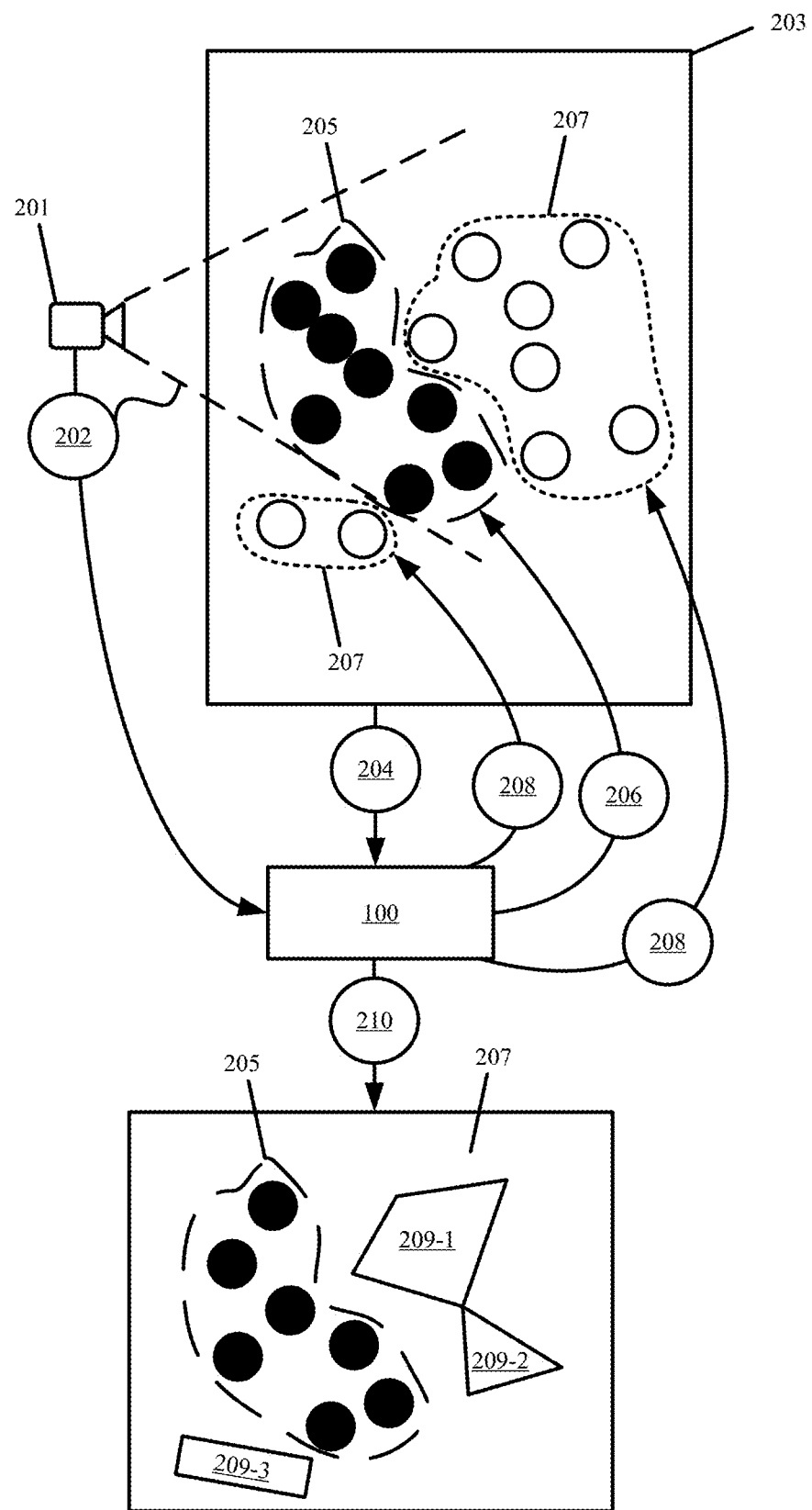
FIG. 2 illustrates an example of differentiating data points that are within a visible region of a point cloud from data points that are outside the visible region, and substituting the non-visible data points with meshes in accordance with some embodiments presented herein.

FIG. 2 illustrates an example of differentiating data points that are within a visible region of a point cloud from data points that are outside the visible region, and substituting the non-visible data points with meshes in accordance with some embodiments presented herein. For simplicity, FIG. 2 is illustrated in two dimensions rather than three dimensions. The techniques and/or operations described with respect to FIG. 2 apply across three dimensions.

As shown in FIG. 2, camera 201 is defined with a position and orientation in the 3D space represented by a point cloud. Hybrid rendering system 100 may calculate (at 202) the field-of-view based on the position and orientation of camera 201.

Hybrid rendering system 100 may also receive (at 204) point cloud 203. The data points of point cloud 203 may be dispersed across a 3D space. The position of each data point in the 3D space is defined by the positional values of that data point.

Hybrid rendering system 100 may analyze the positional values of the data points relative to the field-of-view of camera 201 in order to determine (at 206) first set of data points 205 that are visible by virtue of being positioned in the field-of-view and not being wholly obstructed from camera 201 by one or more other data points in between first set of data points 205 and camera 201. Hybrid rendering system 100 may select (at 208) second set of data points 207 to include the remaining data points that are either outside the field-of-view of camera 201 or are entirely obstructed from the view of camera 201 by one or more data points of first set of data points 205. First set of data points 205 are illustrated in FIG. 2 as filled-in data points with a black center, and second set of data points 207 are illustrated in FIG. 2 as blank data points with a white center.

Hybrid rendering system 100 may directly render each data point from first set of data points 205 in the visible region of the field-of-view to retain the positional detail, high resolution, color accuracy, and/or other characteristic information at each point represented by first set of data points 205. To reduce the resources and time to render the non-visible regions represented by second set of data points 207, hybrid rendering system 100 may generate (at 210) meshes 209-1, 209-2, and 209-3 (hereafter sometimes collectively referred to as "meshes 209" and sometimes individually referred to as "mesh 209") to replace second set of data points 207, and may render meshes 209 in place of each data point of second set of data points 207. Although meshes 209 are used in FIG. 2, hybrid rendering system 100 may substitute one or more of meshes 209 with voxels, polygons, and/or other forms that represent a region of 3D space covered by two or more data points of second set of data points 207.

Hybrid rendering system 100 may generate (at 210) meshes 209 in a manner that minimizes the loss of detail and/or characteristic information represented by each data point of second set of data points 207. In some embodiments, generating meshes 209 may include identifying neighboring data points that are not more than a specified distance from each other. For instance, if the positional values between two data points are greater than a threshold distance from one another, then those two data points are not to be combined in a single mesh. Once hybrid rendering system 100 identifies a neighboring cluster of data points within second set of data points 207, hybrid rendering system 100 may inspect the non-positional values for commonality. Hybrid rendering system 100 may define the shape of each mesh 209 according to the detected commonality, and may define the non-positional values for that mesh 209 based on the non-positional values of the subset of data points included as part of that mesh 209.

In some embodiments, hybrid rendering system 100 may differentiate the data points of a point cloud based on factors or criteria other than visible or non-visible surfaces. For instance, hybrid rendering system 100 may differentiate foreground data points from background data points, wherein the foreground data points may include data points that are less than a particular distance (e.g., z-depth) from the render position, and the background data points may include data points that are more than the particular distance from the render position. Hybrid rendering system 100 may render the foreground data points directly, and may replace the background data points with meshes or polygons to more efficiently render the background with less detail and/or color accuracy.

Figure 3:
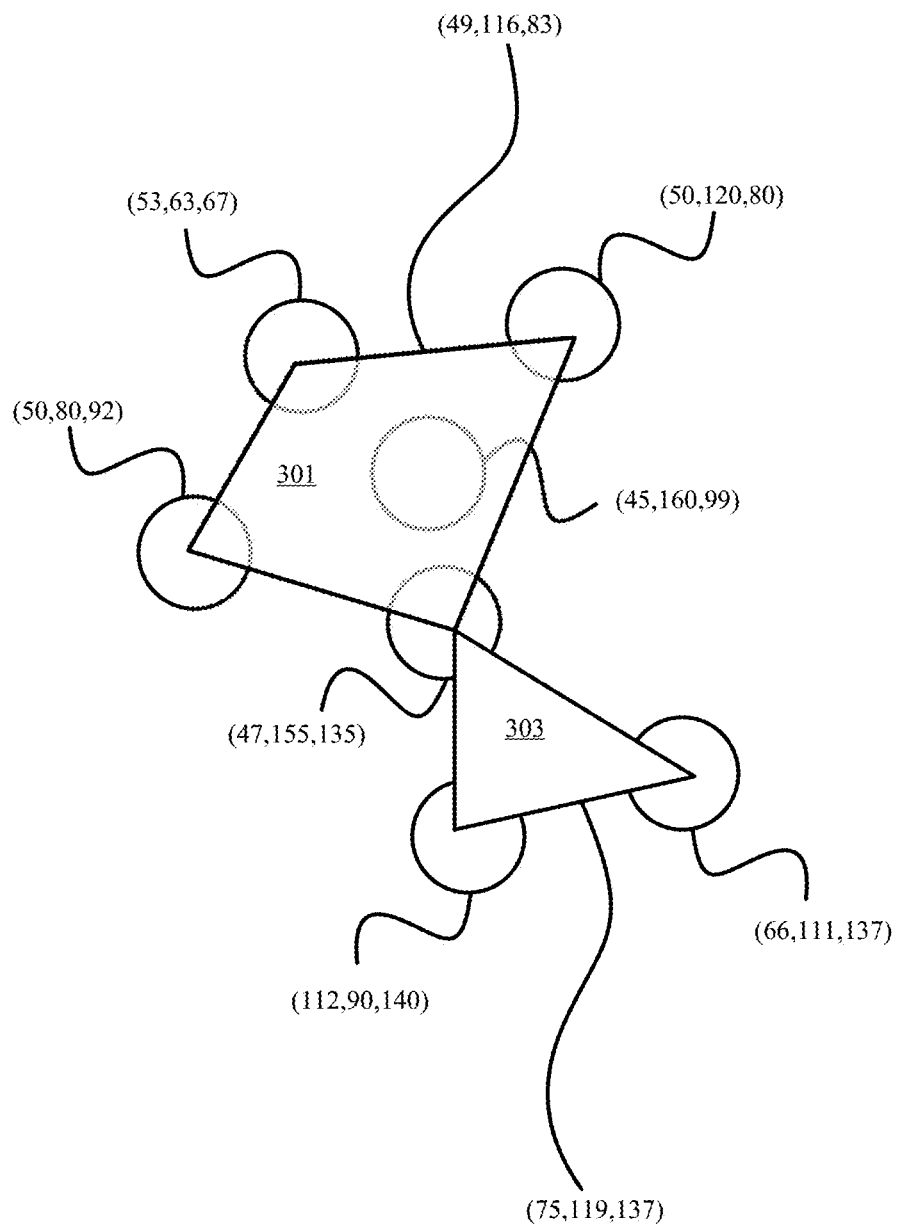
FIG. 3 illustrates an example of defining meshes based on commonality in non-positional values of different subsets of data points in accordance with some embodiments presented herein.

FIG. 3 illustrates an example of defining meshes based on commonality in non-positional values of different subsets of data points in accordance with some embodiments presented herein. FIG. 3 illustrates a set of neighboring non-visible data points and their color values (e.g., respective values for the colors red, green, and blue).

Hybrid rendering system 100 may represent the entire set of data points with one mesh, and may define the color values for that one mesh based on the average red, green, and blue color values for the entire set of data points. Due to the large variation in color values, the single mesh has very poor color accuracy, and is therefore not a suitable substitute for the set of data points.

Accordingly, hybrid rendering system 100 may inspect the color values of the entire set of data points for commonality. Commonality is detected when two or more neighboring data points have color values that are within a threshold range of one another or when the color values deviate by less than a certain value or percentage. Hybrid rendering system 100 may determine that the upper cluster of five data points has red color commonality, and that the lower cluster of three data points has blue color commonality. Hybrid rendering system 100 may therefore generate first mesh 301 to represent the upper cluster and second mesh 303 to represent the lower cluster of data points based on the commonality detected for each cluster.

Hybrid rendering system 100 may define first mesh 301 as a four-sided polygon because the four-sided polygon is the shape that most accurately retains the shape formed by the cluster of five data points that is being replaced by first mesh 301. Hybrid rendering system 100 may then define a single set of non-positional values for first mesh 301 based on the corresponding non-positional values of the cluster of five data points. In some embodiments, hybrid rendering system 100 may define the color values of first mesh 301 according to the average or median color values of the represented five data points. In some other embodiments, hybrid rendering system 100 may derive the color values of first mesh 301 using another formula, computation, or evaluation of the color values of the represented five data points. First mesh 301 therefore retains the shape formed by the upper cluster of five data points and more accurately retains at least the red color than the single mesh for the entire set of data points.

Hybrid rendering system 100 may define second mesh 303 as a triangle because the triangle is the shape that most accurately retains the shape formed by the cluster of three data points that is being replaced by second mesh 303. Hybrid rendering system 100 may then define a single set of non-positional values for second mesh 303 to retain the accuracy of or the commonality in the blue color value of the three data points.

In any case, hybrid rendering system 100 will generate a mesh, voxel, or polygon that best retains the shape of the subset of data points being replaced by that mesh, voxel, or polygon, and will select the subset of data points to have the most commonality across the greatest numbers of non-positional values in order to represent the coloring and/or other descriptive characteristics of the subset of data points being replaced by that mesh, voxel, or polygon. In this manner, a single mesh, voxel, or polygon may represent and/or replace multiple data points, and may closely match the non-positional values of those data points. Rendering the single mesh, voxel, or polygon requires less resources (e.g., memory) and is performed in less time than rendering each of the data points replaced by that single mesh, voxel, or polygon.

Figure 4:
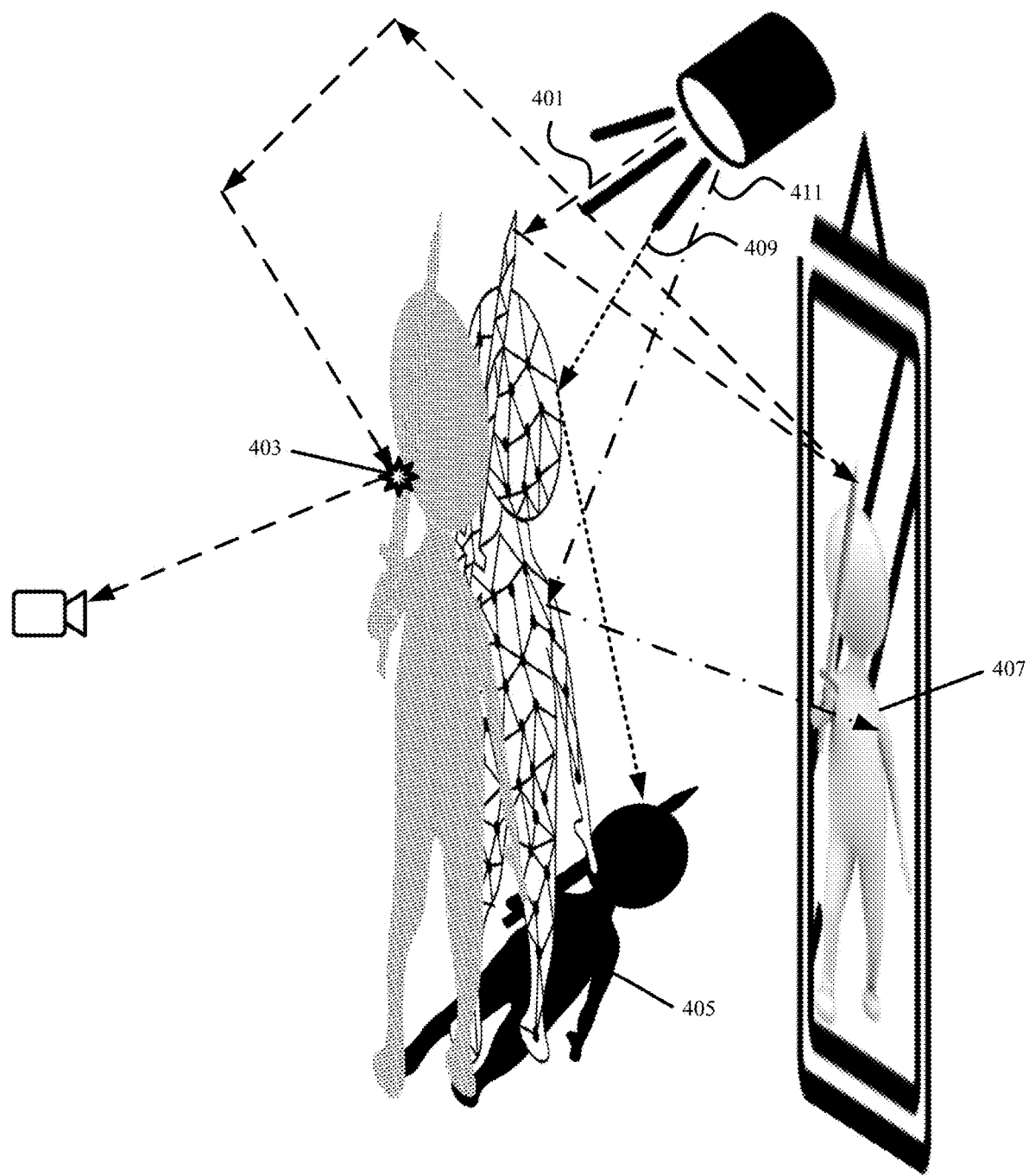
FIG. 4 illustrates an example of rendered meshes in non-visible regions of a 3D environment affecting visible regions of a 3D environment that are rendered with higher detail and more accurate data points in accordance with some embodiments presented herein.

As noted above, the surfaces, features, or elements created by the rendered meshes do not appear in the field-of-view of the generated visualization. However, these non-visible surfaces, features, or elements may nevertheless contribute reflections, lighting, specular highlights, and/or other visual effects to the visible surfaces, features, or elements generated from the rendering of the visible set of data points. Accordingly, hybrid rendering system 100 performs the mesh rendering for the hidden, obstructed, or non-visible surfaces, features, or elements so that the reflections, lighting, specular highlights, and/or other visual effects are not lost, and that extra resources are not spent creating these effects from rendering a larger set of point cloud data points instead of a significantly smaller set of meshes, voxels, or polygons FIG. 4 illustrates an example of rendered meshes in non-visible regions of a 3D environment affecting visible regions of a 3D environment that are rendered with higher detail and more accurate data points in accordance with some embodiments presented herein. As shown in FIG. 4, a ray-tracing or other lighting technique may be used to accurately light the 3D environment. The lighting technique may involve bouncing beams of light that originate from a light source off reflective surfaces that are in the path of the light until the beams reach the camera.

FIG. 4 illustrates first beam 401 initially contacting one or more meshes for the non-visible backside of a sword. The one or more meshes may have reflective, coloring, and/or other characteristics that are defined from the equivalent characteristics of two or more data points that are replaced by the one or more meshes. The lighting technique may modify properties of first beam 401 according to the reflective, coloring, and/or other characteristics of the one or more meshes, and may redirect first beam 401 based on the shape, form, and/or positioning of the one or more meshes. First beam 401 may continue to bounce off other reflective surfaces until contacting the front side of the sword that is rendered using the data points of the point cloud. First beam 401 may add specular highlight, sparkle, or other lighting effect 403 onto the rendered front side of the sword, or may otherwise change the lighting, coloring, or other visualization for the front side of the sword based on the properties of first beam 401 that were modified by the reflective, coloring, and/or other characteristics of the one or more meshes.

As further shown in FIG. 4, the one or more meshes for the non-visible or hidden surfaces may also be used to accurately cast shadow 405 and/or reflection 407. For instance, shadow 405 may be generated as a result of one or more light beams 409 reflecting off one or more meshes for the non-visible backside of the object onto a matte or non-reflective surface. Similarly, reflection 407 may be generated as a result of one or more light beams 411 reflecting off one or more meshes for the non-visible backside of the object onto a mirror or other visible surface that is reflective. Each of shadow 405 and reflection 407 are generated based on the positional and non-positional values of the rendered meshes, whereas the visualization in the foreground and in the field-of-view of the camera is generated based on the positional and non-positional values of each individual data point that is in the foreground, in the field-of-view, and not wholly obstructed from the camera by one or more other data points.

If hybrid rendering system 100 was to ignore and avoid rendering the non-visible surfaces altogether to preserve resources and/or reduce rendering time, then there would be no shadow or reflection cast. The resulting render would be wholly inaccurate and unrealistic.

If hybrid rendering system 100 was to render the non-visible surfaces using the individual data points defined for those surfaces in the point cloud, then the resource and compute overhead would be significantly increased because of the initial rendering of the non-visible surfaces using the data points and also because of the added detail and/or data that results from the render and that is subsequently included in generating the shadow and/or reflection. This additional detail and information are unnecessary for generating a shadow or reflection, and therefore results in wasted resources and render time. The meshes, voxels, or polygons render the non-visible surfaces with less detail, in less time, and with sufficient detail and accuracy for a shadow or reflection. Accordingly, the hybrid rendering optimizes the rendering and/or visualization of a point cloud without compromising the detail and/or accuracy (e.g., color reproduction) at the focal points or visible regions of the point cloud.

Figure 5:
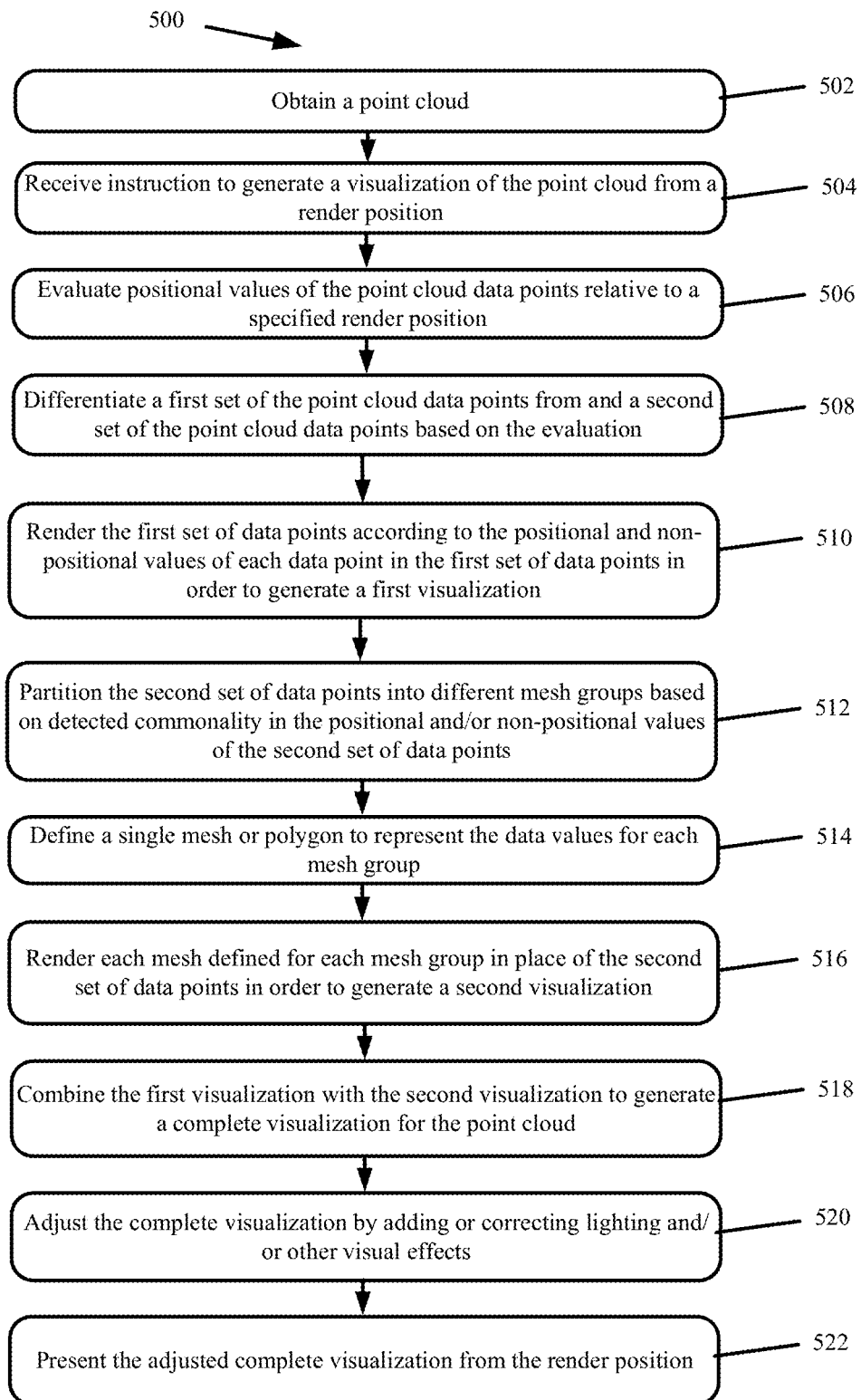
FIG. 5 presents a process for performing the hybrid rendering of a point cloud using the point cloud data points for visible surfaces and the meshes in place of data points for the non-visible surfaces in accordance with some embodiments presented herein.

FIG. 5 presents a process 500 for performing the hybrid rendering of a point cloud using the point cloud data points for visible surfaces and the meshes in place of data points for the non-visible surfaces in accordance with some embodiments presented herein. Process 500 may be implemented by hybrid rendering system 100. Hybrid rendering system 100 may include one or more devices for processing, manipulating, rendering, visualizing, interacting with, and/or otherwise accessing a point cloud.

Process 500 may include obtaining (at 502) a point cloud. Hybrid rendering system 100 may obtain (at 502) the point cloud from local storage or may retrieve the point cloud over a data network. The point cloud may be stored in a file or other data structure.

Process 500 may include receiving (at 504) an instruction to generate a 3D visualization of the point cloud. Generating the 3D visualization may include rendering the elements, features, surfaces, and/or objects represented by the point cloud data points according to the positional values and descriptive characteristics of the data points. The instruction may specify a render position from which to generate the 3D visualization. The render position may specify a field-of-view, position, orientation, and/or other viewing properties from which to generate the visualization.

Process 500 may include evaluating (at 506) positional values of the point cloud data points relative to the render position, and differentiating (at 508) a first set of the point cloud data points from and a second set of the point cloud data points based on the evaluation and/or the particular position of each data point relative to the render position. In some embodiments, the render position may be used to define additional differentiation criteria. For instance, hybrid rendering system 100 may determine the field-of-view of a camera set at the render position, and may use the field-of-view as part of the differentiation criteria for differentiating (at 508) between the first set of data points and the second set of data points.

In some embodiments, the evaluation (at 506) and differentiation (at 508) may include selecting the first set of data points as visible data points of the point cloud that are in the render position field-of-view and that are not wholly obscured from the render position, field-of-view, or the visualization by one or more other data points, and selecting the second set of data points as non-visible data points of the point cloud that are outside the render position field-of-view or are wholly obstructed from the render position, field-of-view, or the visualization. For instance, hybrid rendering system 100 may inspect the (x,y,z) coordinates of each data point relative to the render position in order to determine if that data point is positioned within the visualization field-of-view and/or if that data point is wholly obscured from the render position by one or more other data points. In some such embodiments, evaluating (at 506) the positional values may include sorting the data points to different planes that are defined relative to the render position, and determining if a data point in a particular plane is obscured by one or more data points in one or more planes that are closer to the rendering position, wherein the determination may be based on the data points having two of the (x,y,z) coordinates in common or two of the (x,y,z) coordinates defined with a particular offset that matches the angle or orientation of the render position. Additionally, hybrid rendering system 100 may determine if one or more of the data points that are sorted to a particular plane are within or outside the field-of-view defined for the render position.

Process 500 may include rendering (at 510) the first set of data points according to the positional and non-positional values of each data point in the first set of data points in order to generate a first visualization. Rendering (at 510) the first set of data points may include selecting each particular data point of the first set of data points, and generating a graphical point in 3D space at a position defined by the positional values of the particular data point (e.g., x, y, and z coordinate values) and with visual or descriptive characteristics (e.g., lighting, coloring, chrominance, etc.) defined by the non-positional values of the particular data point. Accordingly, the positional and non-positional values of each rendered data point of the first set of data points may contribute a different graphical element or feature to the first visualization. Rendering (at 510) the first set of data points may include gradually producing the visible surfaces of the point cloud with each data point of the first set of data points adding detail (e.g., another element or feature) to the visible surfaces and contributing coloring, chrominance, luminance, and/or other descriptive characteristics for the added detail. Rendering (at 510) the first set of data points may produce a first visualization that has more detail (e.g., higher resolution), greater descriptive accuracy (e.g., color accuracy, lighting accuracy, etc.) than rendering the same visible surfaces using meshes, voxels, or polygons because there are more data points defined for the same region of space covered by a single mesh, voxel, or polygon and those additional data points provide greater surface detail, greater resolution for the visualized surface, and/or more descriptive information to apply across the visualized surface.

Process 500 may include partitioning (at 512) the second set of data points into different groups of meshes, voxels, or polygons based on detected commonality in the positional and/or non-positional values of the second set of data points. The partitioning (at 512) may include identifying different subsets of the second set of data points for distinct hidden surfaces of the point cloud.

Hybrid rendering system 100 may identify the different subsets of data points based on commonality in one or more data values of each subset of data points. Hybrid rendering system 100 may detect commonality when one or more positional values and/or non-positional values of two neighboring data points do not vary by more than a specified amount or percentage. For instance, a partitioned subset of data points for a particular mesh group may include two or more of the second set of data points that are within a certain region or a maximum distance from one another, and that have similar color data values (e.g., color values that are within a threshold range of one another). When neighboring data points (e.g., data points with positional commonality) do not have descriptive commonality, hybrid rendering system 100 may detect two distinct non-visible surfaces that may be connected or next to one another but that represent different surfaces, elements, features, or objects of the point cloud. For example, a second set of data points representing a non-visible side of a car may have a first subset of data points with darker or black color values that correspond to a tire, and a second subset of data points with lighter color values that correspond to the car body panels around the tire. In this example, hybrid rendering system 100 may partition the first subset of data points to a first mesh group, and the second subset of data points to a second mesh group.

Process 500 may include defining (at 514) a single mesh, voxel, or polygon with a singular set of values to represent the positional and non-positional values for each of the two or more data points partitioned to a mesh group. Defining (at 514) the mesh, voxel, or polygon may include determining a single shape or form that encompasses the region spanned by the subset of data points in a particular mesh group. In some embodiments, the hybrid rendering system 100 may use triangles, rectangles, and/or other polygonal shapes of varying sizes to cover the region spaced by the subset of data points. In some embodiments, the positional values for the mesh, voxel, or polygon may be based on the positional values of the data points at each corner, edge, or boundary of the mesh, wherein the positional values for data points inside the region spanned by the mesh, voxel, or polygon may be discarded or not included in the mesh definition. In some other embodiments, the meshes, voxels, or polygons may be of a fixed size or shape such that the positional values for the defined mesh, voxel, or polygon may include a center position of the mesh, voxel, or polygon. The edges or region spanned by that mesh, voxel, or polygon may be determined from the center position and the fixed size or shape selected for that mesh, voxel, or polygon. Defining (at 514) the mesh, voxel, or polygon may further include determining non-positional data values for the defined mesh, voxel, or polygon based on the non-positional data values of the subset of data points represented by that mesh, voxel, or polygon. In some embodiments, the non-positional data values for the mesh, voxel, or polygon may be defined based on the average, median, and/or sampling of the non-positional data values of the subset of data points. In some other embodiments, the non-positional data values for the mesh, voxel, or polygon may be computed or derived from the non-positional data values of the subset of data points. For instance, hybrid rendering system 100 may compute the RGB color values for a single mesh, voxel, or polygon from the RGB color values of the one or more data points at the center of the mesh, voxel, or polygon or from the RGB color values of the one or more data points at the edges, corners, or boundaries of the mesh, voxel, or polygon.

Process 500 may include rendering (at 516) each mesh, voxel, or polygon defined for each group in place of the second set of data points in order to generate a second visualization for the surfaces of the point cloud that are not visible from the render position. Rendering (at 516) a mesh, voxel, or polygon may consume less memory and may be completed in less time than rendering the subset of two or more data points represented by that mesh, voxel, or polygon, because the mesh, voxel, or polygon is a single construct with a single set of values from which a region covered by the subset of two or more data points may be visualized, whereas rendering the subset of two or more data points includes rendering multiple data points, each with its own set of values, to visualize the same region. Rendering the mesh, voxel, or polygon results in lesser color accuracy than rendering the subset of two or more data points because a single set of color values are used to generate the visualization for the region when rendering the mesh, voxel, or polygon, whereas multiple sets of color values for each data point are used to generate the visualization for the same region when rendering the subset of two or more data points. Similarly, the detail of the rendered region is lower because the singular construct of the mesh, voxel, or polygon is used to generate the visualization for that region, whereas the subset of two or more data points provides more data points from which to generate the visualization for that same region. Specifically, the two or more data points may define different depths, surface textures, positional offsets, etc. in a region of 3D space that may be impossible when using a single polygonal construct to define that same region of space. Since the meshes, voxels, or polygons represent hidden surfaces or surfaces that are not initially within the render position field-of-view, the lower accuracy and detail resulting from rendering the meshes, voxels, or polygons does not degrade the accuracy or detail of the visible surfaces that are presented as a result of rendering the first set of data points.

Process 500 may include combining (at 518) the first visualization, that is produced from rendering the first set of data points, with the second visualization, that is produced from rendering the meshes, voxels, or polygons in place of the second set of data points, in order to generate a complete visualization for the point cloud. Combining the visualizations may include generating a composite 3D image from two 3D images (e.g., the first visualization and the second visualization) that rendered for the same region or volume of 3D space represented by the point cloud.

Process 500 may include adjusting (at 520) the complete visualization resulting from rendering the first set of data points and the meshes, voxels, or polygons. Adjusting (at 520) the complete visualization may include adding or correcting the lighting, reflections, shadows, specular highlights, and/or other visual characteristics based on one or more light sources, lighting techniques, or special effects that are added to enhance the complete visualization. For instance, ray-tracing or other lighting techniques may be used to enhance the visualization by accurately capturing the effects of lighting bouncing off various visible and non-visible surfaces from the combined first and second visualizations.

Process 500 may include presenting (at 522) the adjusted complete visualization from the render position. Specifically, hybrid rendering system 100 may output, on a screen or display, a 3D visualization of the 3D environment represented by the point cloud from the render position.

The adjusted complete visualization provides more than just a 3D image. In some embodiments, the adjusted complete visualization contains the necessary information for implementing real-world physics and/or accurate interactions between different elements, features, objects, and/or surfaces that are presented in the adjusted complete visualization. For instance, the meshes, voxels, or polygons that replace different subsets of non-visible data points may inherit or have material properties that are derived from the replaced subset non-visible data points. The material properties may include non-positional values that affect the physics or interactions that one surface or object has with another. For instance, material properties may correspond to magnetic properties, hardness or softness, weight, strength, etc. The hybrid rendering therefore retains the material properties of the data points even when some of the data points are replaced with meshes, voxels, or polygons in the final rendering.

The material properties may affect interactions between a rendered object or surface that moves in the 3D environment and comes into contact with another rendered object or surface. For instance, the first set of data points may generate a visualization for a ball within a 3D environment, and the second set of data points may generate a visualization for a barrier or wall within the 3D environment that is not visible from the current render position. Should the ball come into contact with the barrier or wall, hybrid rendering system 100 may account for the hardness values of a subset of the first set of data points and the hardness values for a subset of meshes, voxels, or polygons contacted by the subset of second set of data points, and may compute the physics associated with the ball coming into contact with the barrier or wall based on the hardness values from the subset of data points and the subset of meshes, voxels, or polygons. Computing the physics may include computing the force, distance, and/or angle at which the ball, represented by the first set of data points, is to bounce off the hidden barrier or wall, represented by the meshes, voxels, or polygons that replaced the second set of data points.

In some embodiments, process 500 may be modified to perform a different evaluation (at 506) and differentiation (at 508) of the point cloud data points. For instance, hybrid rendering system 100 may evaluate (at 506) the positional values of the point cloud data points in order to differentiate (at 508) a first set of data points that are less than a specified distance or depth from the render position, and a second set of data points that are more than the specified distance or depth from the render position. In this manner, process 500 may be modified to render (at 510) the individual data points for the first set of data points in the foreground of the point cloud so that the foreground is visualized with the most possible detail and accuracy, and to render (at 516) meshes, voxels, or polygons in place of the second set of background data points so that the background of the adjusted complete visualization is rendered in less time using less resources where the detail and accuracy is less important or noticeable than in the foreground.

In some embodiments, process 500 may be modified so that a user selects or defines the region that is to be rendered with the additional detail and accuracy of the point cloud data points, or, alternatively, the region that is to be rendered with the lesser detail and accuracy of the constructs (e.g., meshes, voxels, or polygons) that each replace two or more data points and provide a singular set of values to represent the non-positional values (e.g., color, chrominance, luminance, strength, density, weight, thickness, etc.) of the data points being replaced by the construct. For instance, a user may use a lasso tool to draw a region or volume or may define a set of coordinates where the higher definition or resolution rendering is desired. Hybrid rendering system 100 may search the point cloud to identify a first set of data points that fall within the specified region, volume, or set of coordinates, may directly render the first set of data points, and may render the rest of the point cloud using a set of meshes, voxels, or polygons that approximate the forms and descriptive characteristics of the other data points falling outside the specified region, volume, or set of coordinates.

Figure 6:
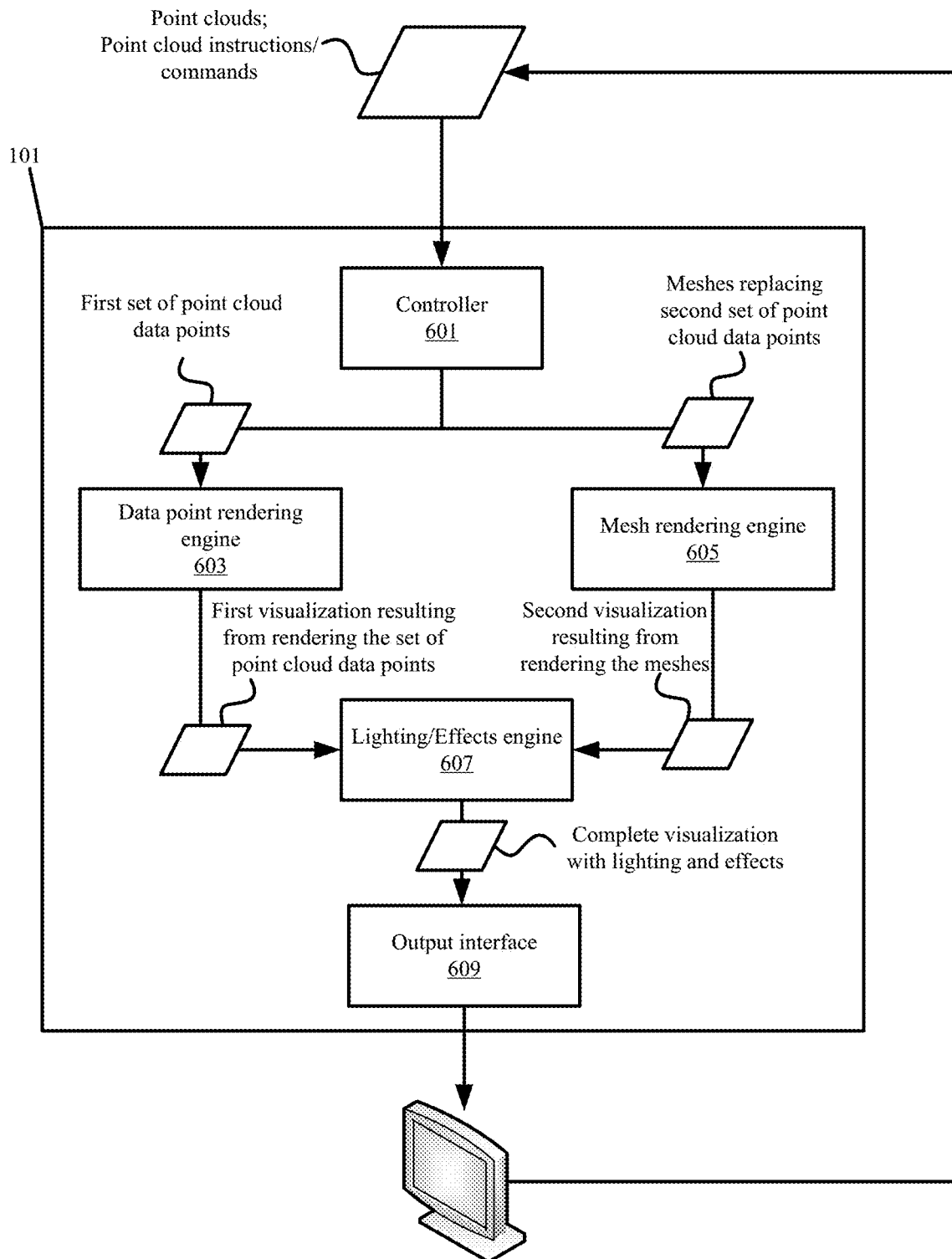
FIG. 6 illustrates an example architecture for the hybrid rendering system in accordance with some embodiments presented herein.

FIG. 6 illustrates an example architecture for hybrid rendering system 100 in accordance with some embodiments presented herein. As shown in FIG. 6, hybrid rendering system 100 may include controller 601, data point rendering engine 603, mesh rendering engine 605, lighting and effects engine 607, and/or output interface 609. These and other components of hybrid rendering system 100 may be implemented on one or more devices, machines, or sets of hardware resources.

Controller 601 may include logic for opening, accessing, reading, evaluating, modifying, and/or partitioning different point clouds. For instance, controller 601 may perform the differentiation of point cloud data points (e.g., first set of data points for visible surfaces and second set of data points for non-visible surfaces), and may define the meshes, voxels, or polygons that are to be rendered in place of a differentiated set of data points. Controller 601 may provide a first set of data points to data point rendering engine 603, and the meshes, voxels, or polygons that are defined for a second set of data points to mesh rendering engine 605.

Data point rendering engine 603 may receive and directly render the first set of data points differentiated by controller 601. Data point rendering engine 603 may generate a visualization directly from the positional and non-positional values of each received data point.

Mesh rendering engine 605 may receive and render the meshes, voxels, or polygons instead of the second set of data points differentiated by controller 601. In particular, mesh rendering engine 605 may generate a visualization from the shapes and values of the smaller set of received meshes, voxels, or polygons rather than the larger second set of data points that are replaced by the meshes, voxels, or polygons. Accordingly, data point rendering engine 603 and mesh rendering engine 605 may receive and operate on different data (e.g., point cloud data points versus meshes, voxels, or polygons).

An advantage of separating data point rendering engine 603 from mesh rendering engine 605 is that the rendering of the first set of data points and the rendering of the meshes, voxels, or polygons representing the second set of data points may be performed in parallel. For instance, a first Graphics Processing Unit ("GPU") may be allocated to data point rendering engine 603, and may be used to render the first set of data points while a second GPU allocated to mesh rendering engine 605 may be used at the same time to render the meshes, voxels, or polygons representing the second set of data points. In this manner, hybrid rendering system 100 may perform the hybrid rendering in a parallel manner, thereby reducing the time to produce the point cloud visualization. Specifically, the first visualization resulting from the rendering of the first set of data points may be generated in parallel as the second visualization resulting from the rendering of the meshes, voxels, or polygons.

The rendering results from data point rendering engine 603 and mesh rendering engine 605 may be provided as inputs to lighting and effects engine 607. Lighting and effects engine 607 may combine the separate renders to produce a single visualization for the point cloud, and may adjust the visualization by applying lighting and/or other visual effects to the single visualization.

In some embodiments, the hybrid rendering may be used for video games, architectural design applications, manufacturing design applications, planning, scientific analysis applications, and/or other applications in which a user may edit, manipulate, move, and/or interact with the rendered visualization of the 3D environment. For instance, zooming in from a current render position or changing the render position may cause hybrid rendering system 100 to render the point cloud anew or update the hybrid rendering to provide a modified visualization for the new render position.

In some embodiments, hybrid rendering system 100 may reduce the resource and/or processing overhead associated with changing the visualization of a 3D environment as a result of the render position changing. In some such embodiments, hybrid rendering system 100 may reuse the previously rendered results by rendering just the regions that were previously not rendered (e.g., outside the last field-of-view) or by updating regions that were rendered using the meshes and that have become visible, moved into the foreground, or otherwise satisfy the differentiation criteria for direct point rendering as a result of the new render position. Specifically, the regions that were rendered directly from the data values of the point cloud data points (e.g., the first set of data points) already have a maximum level of detail and characteristic accuracy. In these regions, hybrid rendering system 100 may adjust the scale, orientation, and/or size of these regions according to the change in the viewing position without reevaluating the data values of the rendered data points. For the other regions that were rendered using the lesser detailed and accurate meshes, voxels, or polygons, and that now satisfy the differentiation criteria for the more detailed and accurate data point rendering, hybrid rendering system 100 may initially adjust the scale, orientation, and/or size of the lower detail render resulting from the meshes, voxels, or polygons to ensure that the user is presented with some visualization. If the render position continues to move (e.g., a camera pans through the 3D environment), hybrid rendering system 100 may continue to display the lower detail render resulting from the meshes, voxels, or polygons as the changing render position creates motion blur making the lower detail renders sufficient. However, should the render position move to and stop at a fixed position, hybrid rendering system 100 may replace the visualization resulting from the rendered meshes by individually rendering each data point that is represented by the meshes, voxels, or polygons.

Figure 7:
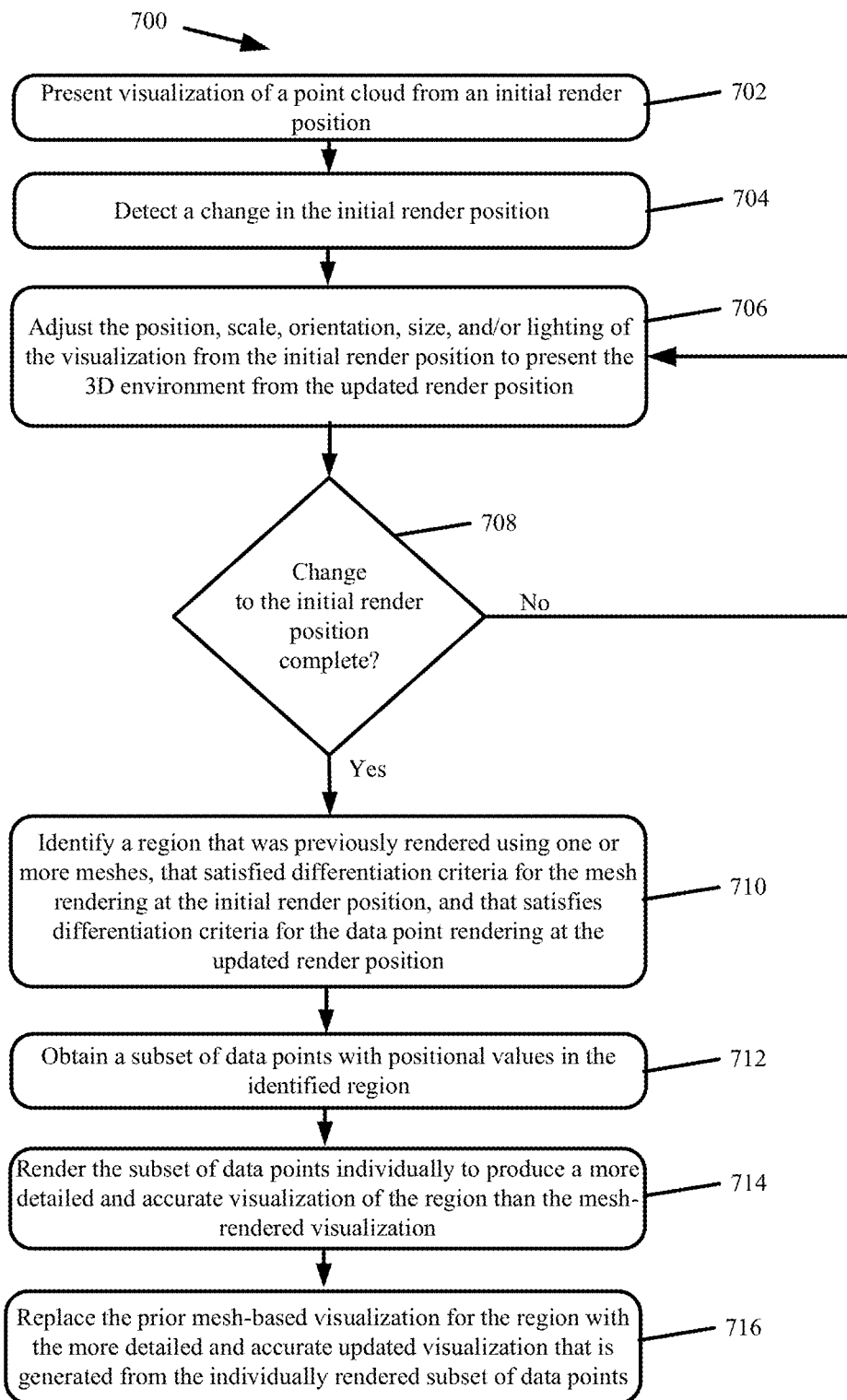
FIG. 7 presents a process for a partial hybrid rendering of a point cloud in response to a changing render position in accordance with some embodiments presented herein.

FIG. 7 presents a process 700 for a partial hybrid rendering of a point cloud in response to a changing render position in accordance with some embodiments presented herein. Process 700 may be implemented by hybrid rendering system 100 or as part of 3D imaging and/or editing application that allows user the ability to interact with the rendered visualization of a point cloud in various ways.

Process 700 may include presenting (at 702) a visualization of the point cloud from an initial render position. The visualization of the initial render position may be generated according to process 500 and/or in response to a user device opening or accessing the point cloud.

Process 700 may include detecting (at 704) a change in the initial render position. For instance, hybrid rendering system 100 may receive input from the user device that changes the position of a virtual camera that defines the render position, or may receive input that zooms-in, rotates, moves, and/or otherwise transitions from the initial render position.

Process 700 may include adjusting (at 706) the position, scale, orientation, size, and/or lighting of the visualization from the initial render position to present the 3D environment from the updated render position. It is important to note that hybrid rendering system 100 may perform the adjustments without rendering any of the point cloud data points or the meshes, voxels, or polygons anew, and may modify what is already rendered to provide the visualization from the updated render position. In other words, the visualization from the initial render position includes information for all visible and non-visible surfaces as generating the visualization the initial render position involved rendering a first set of data points of a point cloud and meshes, voxels, or polygons in place of all other data points of that point cloud.

Process 700 may include determining (at 708) whether the change to the initial render position has stopped after some amount of time. For instance, if the updated render position has not changed for one second, hybrid rendering system 100 may determine (at 708) that the change to the initial render position has stopped. If the updated render position has changed in the last second, hybrid rendering system 100 may determine (at 708) that the render position is still being modified.

In response to determining (at 708—No) that the render position is still being changed, process 700 may include continually adjusting (at 706) the position, scale, orientation, size, and/or lighting of the visualization from the initial render position to present the 3D environment from the latest render position. For instance, the hybrid rendering system 100 may update the visualization every second, 30 times per second, or at some other frequency in response to the user changing the render position. The changing render position may present regions of the 3D environment that were previously outside the field-of-view or that were previously obscured by other surfaces and were therefore rendered using meshes, voxels, or polygons. Hybrid rendering system 100 may continue to adjust and present the visualizations produced from the rendered meshes, voxels, or polygons because the render position is continually changing and the lower quality images produced from the rendered meshes, voxels, or polygons may go unnoticed as they are presented for a short duration of time (e.g., one second or less) and the human eye is unable to differentiate the level of detail presented in the regions rendered with the more accurate and detailed point cloud data points from the regions rendered with the less accurate and detailed meshes, voxels, or polygons. In other words, the previously rendered meshes, voxels, or polygons present the 3D environment of the point cloud with sufficient detail when the visualization of the 3D environment is continually changing.

In response to determining (at 708—Yes) that the render position has not changed for a specified period of time and has settled to a new render position, process 700 may include identifying (at 710) one or more regions that were previously rendered using one or more meshes, voxels, or polygons, that satisfied differentiation criteria for the mesh rendering at the initial render position, and that satisfy differentiation criteria for the data point rendering at the updated render position. For instance, hybrid rendering system 100 may identify (at 710) one or more previously non-visible regions that have become visible at the new render position with the differentiation criteria specifying the data point rendering of any visible regions.

Process 700 may include obtaining (at 712) the subset of data points with positional values in the one or more identified regions, rendering (at 714) the subset of data points individually to generate an updated visualization for the one or more identified regions that is more detailed and accurate than the prior mesh-rendered visualization (e.g., the visualization created from rendering the meshes, voxels, or polygons), and replacing (at 716) the prior mesh-based visualization with the more detailed and accurate updated visualization that is generated from the individually rendered (at 714) subset of data points. In particular, hybrid rendering system 100 may generate the visualization that replaces the mesh-rendered visualization for the identified regions by creating a graphical point at the positional value of each data point of the subset of data points, and by defining the visual characteristics and/or material properties of the graphical point according to the non-positional values of each data point of the subset of data points. Accordingly, process 700 uses the mesh-generated visualizations to provide an initial presentation of the previously non-visible regions that are moved into the camera's field-of-view, and to improve the accuracy and detail of those regions by replacing the mesh-generated visualizations with the data point-generated visualizations once the camera has stopped and the previously non-visible regions remain within the camera's field-of-view.

In some embodiments, process 700 may be modified to account for the speed with which the render position changes, the speed with which frames of a video-encoded point cloud change, or the amount of information that changes with the render position or new frame. For instance, hybrid rendering system 100 may have sufficient processor, memory, and/or other resources to render one million data points every second. If the change in the render position occurs every second and the number of data points being changed for the new render position is greater than one million data points, then hybrid rendering system 100 may render the new render position with the meshes, voxels, or polygons that approximate the forms and descriptive characteristics of the one million data points, and may increase the quality of the render by individually rendering the data points should the new render position remain unchanged for more than one second or if hybrid rendering system 100 has additional time after rendering the meshes, voxels, or polygons within the one second interval to render the individual data points. Alternatively, if the change in the render position occurs every second and the number of data points being changed for the new render position is less than one million data points, then hybrid rendering system 100 may render each individual data point at the new render position. Similarly, if each next frame of a video-encoded point cloud is rendered at a one second interval, and a next frame has more than one million data points, then hybrid rendering system 100 may render that next frame with meshes, voxels, or polygons instead of the individual data points. Should hybrid rendering system 100 have additional rendering cycles after rendering the meshes for the next frame and before it is time to render the next frame, hybrid rendering system 100 may render a sampling of the data points to enhance the visualization until it is time to render another frame. If a next frame has less than one million data points, then hybrid rendering system 100 may render each individual data point for that next frame.

In some embodiments, hybrid rendering system 100 may implement a reverse hybrid rendering technique to efficiently and accurate render a point cloud. The reverse hybrid rendering technique may involve rendering the entirely of the point cloud with meshes, voxels, and/or polygons to quickly generate an initial presentation, and then increase the detail in the visible field-of-view by rendering the data points that are positioned within the visible field-of-view. As the camera position changes, the reverse hybrid rendering technique may initially present the visualizations generated from the meshes, voxels, and/or polygons before increasing the detail at the new camera position with a rendering of the data points falling within the altered camera field-of-view.

Figure 8:
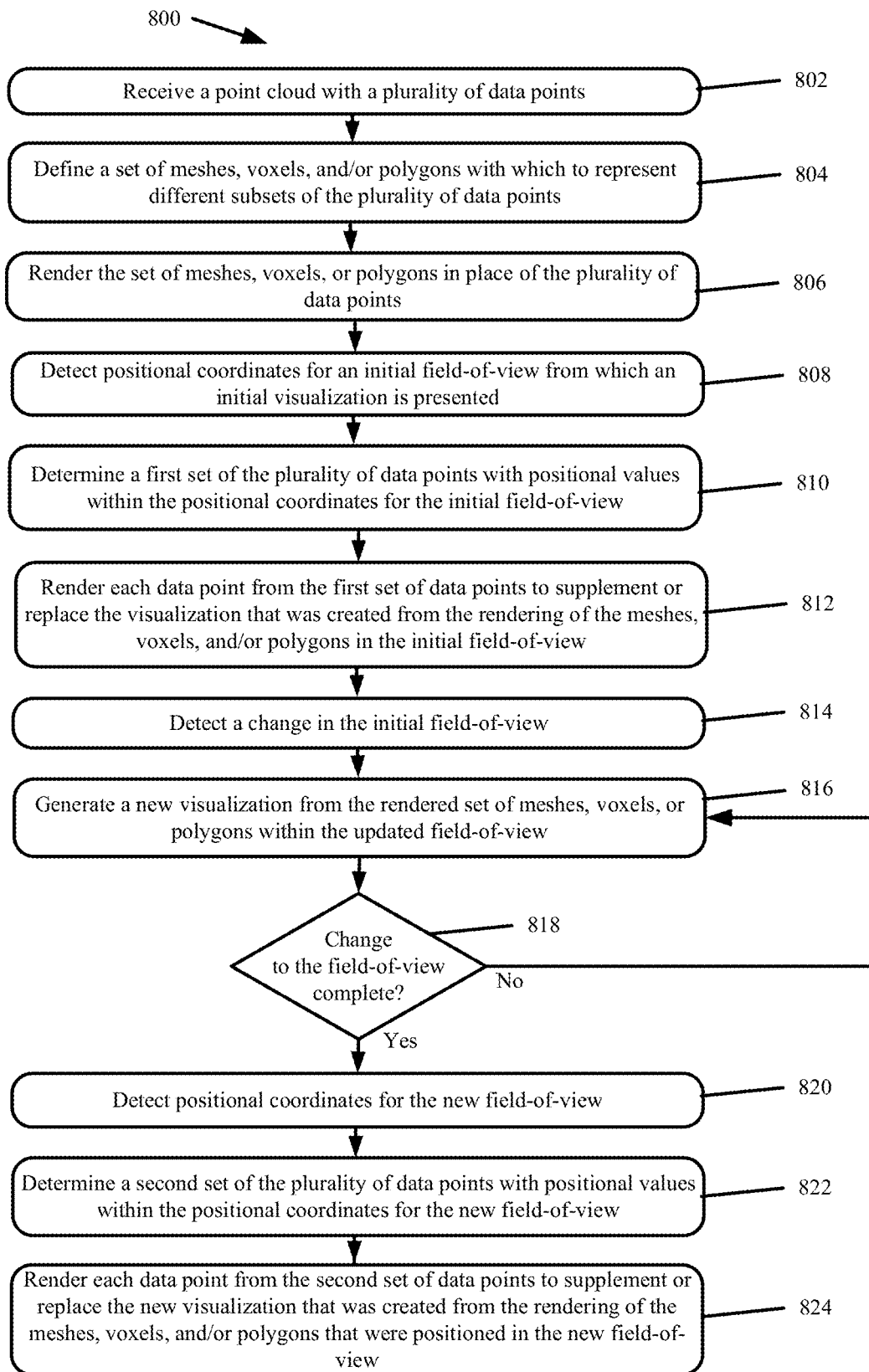
FIG. 8 presents a process for a reverse hybrid rendering technique in accordance with some embodiments presented herein.

FIG. 8 presents a process 800 for the reverse hybrid rendering technique in accordance with some embodiments presented herein. Process 800 may be implemented by hybrid rendering system 100.

Process 800 may include receiving (at 802) a point cloud with a plurality of data points. Process 800 may defining (at 804) a set of meshes, voxels, and/or polygons with which to represent different subsets of the plurality of data points. Each mesh, voxel, or polygon may have a shape that spans a region or volume in 3D space of the point cloud that is covered by two or more of the data points, and may include a single set of values that represent the positional and/or non-positional data values of the two or more data points. Accordingly, the set of meshes, voxels, and/or polygons may represent the entirety of the point cloud with less data than the plurality of data points.

Process 800 may include rendering (at 806) the set of meshes, voxels, or polygons in place of the plurality of data points. In other words, all surfaces, features, or objects of the point cloud may be initially rendered with meshes, voxels, or polygons. The rendering (at 806) generates a visualization that is created faster and with fewer resources than rendering each of the data points, but that is of lesser accuracy or detail than when rendering each of the data points.

Process 800 may include detecting (at 808) positional coordinates for an initial field-of-view from which the visualization is presented. In other words, the rendering (at 806) may create a visualization for the entire point cloud, but the presented field-of-view may be limited to a part of the visualization.

Process 800 may include determining (at 810) a first set of the plurality of data points with positional values within the positional coordinates for the initial field-of-view. Process 800 may include enhancing the presented visualization by rendering (at 812) each data point from the first set of data points to supplement or replace the visualization that was created from the rendering (at 806) of the meshes, voxels, and/or polygons in the initial field-of-view. In this manner, hybrid rendering system 100 may provide an initial lower resolution presentation for the visible field-of-view while the detail and/or accuracy from the individual data points is gradually added into the presentation.

Process 800 may include detecting (at 814) a change in the initial field-of-view. For instance, hybrid rendering system 100 may receive input from the user device that changes the position of a virtual camera that defines the field-of-view that is presented, or may receive input that zooms-in, rotates, moves, and/or otherwise transitions from the initial field-of-view.

Process 800 may include generating (at 816) a new visualization from the rendered set of meshes, voxels, or polygons within the updated field-of-view. Process 800 may include determining (at 818) whether the change to the field-of-view has stopped after some amount of time.

In response to determining (at 818—No) that the field-of-view is still being changed, process 800 may include continually generating (at 816) a new visualization from the rendered set of meshes, voxels, or polygons within the updated field-of-view. In response to determining (at 818—Yes) that the field-of-view has not changed for a specified period of time (e.g., 50 milliseconds) and has settled to a new field-of-view, process 800 may include detecting (at 820) positional coordinates for the new field-of-view, determining (at 822) a second set of the plurality of data points with positional values within the positional coordinates for the new field-of-view, and generating an enhanced visualization for the new field-of-view by rendering (at 824) each data point from the second set of data points to supplement or replace the new visualization that was created from the rendering of the meshes, voxels, and/or polygons that were positioned in the new field-of-view.

In some embodiments, process 800 may be modified such that a user specifies or selects the set of data points that are to be directly rendered and used to enhance a portion of the visualization created with the lower quality meshes, voxels, and/or polygons. For instance, hybrid rendering system 100 may render the entirety of a point cloud with constructs that each approximate the positioning and descriptive characteristics of two or more of the point cloud data points. Hybrid rendering system 100 may receive user input that identifies a particular region or volume to render with the additional detail of the point cloud data points. Hybrid rendering system 100 may select the set of data points with positional values or coordinates within the particular region or volume, and may enhance the visualization of the particular region or volume by replacing the construct-rendered visualization for the particular region or volume with a more detailed visualization that is created from rendering each individual data point that is determined to be within the particular region or volume.

Figure 9:
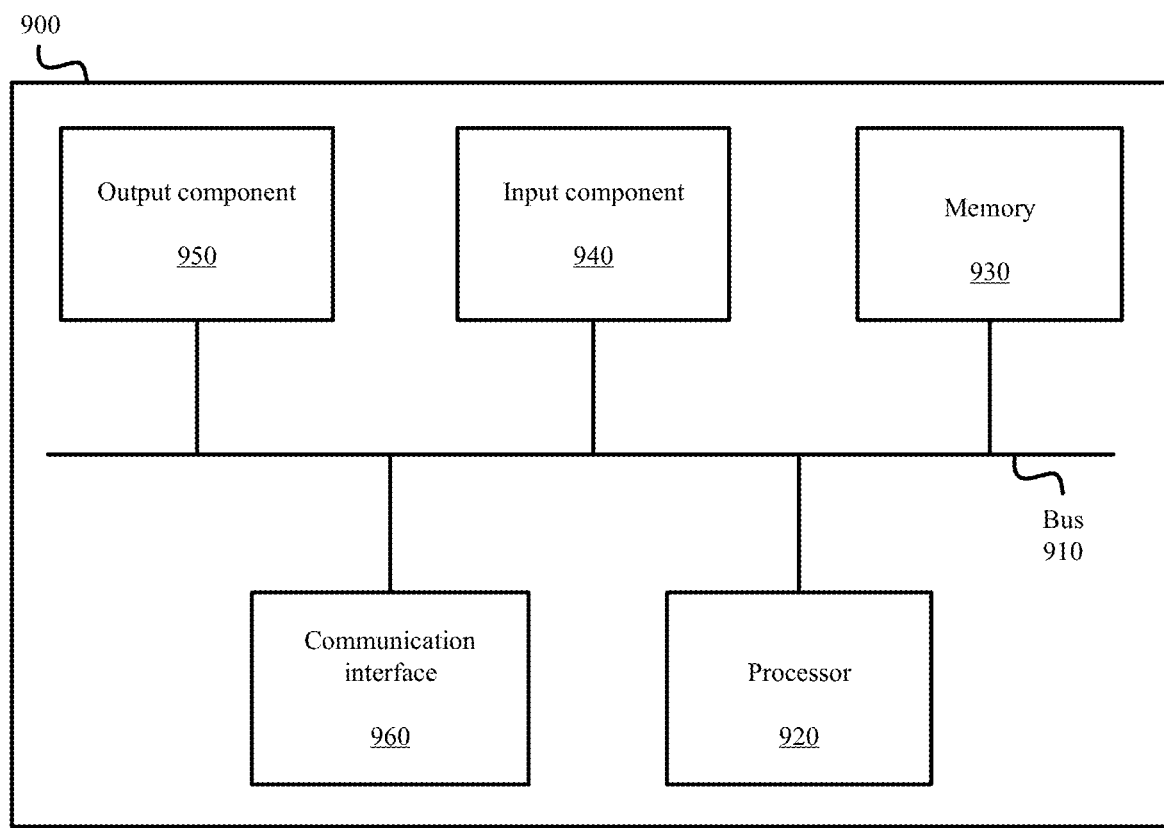
FIG. 9 illustrates example components of one or more devices, according to one or more embodiments described herein.

FIG. 9 is a diagram of example components of device 900. Device 900 may be used to implement one or more of the devices or systems described above (e.g., hybrid rendering system 100, the various components of hybrid rendering system 100, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving a point cloud comprising a plurality of data points that are distributed non-uniformly in three-dimensional ("3D") space to represent a 3D environment, each data point of the plurality of data points comprising a plurality of values that define (i) a particular position of the data point in the 3D space and (ii) descriptive characteristics that define properties of a surface, a feature, or an object of the 3D environment that is detected at that particular position;
    determining a render position from which to render the 3D environment;
    differentiating a first set of the plurality of data points from a second set of the plurality of data points based on the particular position of each data point relative to the render position;
    generating a first visualization from the plurality of values of each individual data point of the first set of data points;
    generating a second visualization from values of a set of constructs, wherein each construct of the set of constructs comprises a polygonal shape with a singular set of values defined from the plurality of values of two or more different data points from the second set of data points; and
    presenting the 3D environment from the render position by combining the first visualization with the second visualization.

2. The method of claim 1 further comprising:
    defining the polygonal shape of a particular construct of the set of constructs to encompass a region spanned by a particular subset of two or more data points from the second set of data points; and
    deriving the singular set of values for the particular construct from the plurality of values of each data point from the particular subset of data points.

3. The method of claim 1, wherein a number of constructs in the set of constructs is less than a number of data points in the second set of data points.

4. The method of claim 1, wherein differentiating the first set of data points from the second set of data points comprises:

determining that the plurality of values of each data point from the first set of data points satisfies criteria associated with the render position; and
    determining that the plurality of values of each data point from the second set of data points does not satisfy the criteria.

5. The method of claim 1, wherein differentiating the first set of data points from the second set of data points comprises:
    identifying the first set of data points as data points that are visible from the render position; and
    identifying the second set of data points as data points that not visible from the render position.

6. The method of claim 1 further comprising:
    determining a field-of-view of a camera set at the render position; and
    wherein differentiating the first set of data points from the second set of data points comprises:
        identifying the first set of data points with positions that are in the field-of-view and that are not wholly obscured from the render position by one or more data points; and
        identifying the second set of data points with positions that are outside the field-of-view or that are wholly obscured from the render position by one or more data points.

7. The method of claim 1, wherein differentiating the first set of data points from the second set of data points comprises:
    determining the first set of data points to be less than a specified distance from the render position; and
    determining the second set of data points to be more than the specified distance from the render position.

8. The method of claim 1,
    wherein generating the first visualization comprises rendering each data point of the first set of data points with the plurality of values of each data point of the first set of data points contributing a different graphical element or feature to the first visualization; and
    wherein generating the second visualization comprises rendering each particular construct of the set of constructs with the singular set of values of each particular construct contributing a single graphical element or feature to the second visualization in place of two or more graphical elements provided by the two or more data points of the second set of data points replaced by the particular construct.

9. The method of claim 1 further comprising:
    detecting a first subset of the second set of data points in which the particular position of each data point in the first subset of data points is no more than a specified distance from at least one other data point in the first subset of data points, and the descriptive characteristics of each data point in the first subset of data points have a first commonality;
    detecting a second subset of the second set of data points in which the particular position of each data point in the second subset of data points is no more than a specified distance from at least one other data point in the second subset of data points, and the descriptive characteristics of each data point in the second subset of data points have a second commonality that is different than the first commonality detected for the first subset of data points; and
    defining a first construct of the set of constructs as a substitute for the first subset of data points, and a second construct of the set of constructs as a substitute for the second subset of data points.

10. The method of claim 1 further comprising:
adjusting lighting of the 3D environment from the render position based on reflective characteristics of the first set of data points from which the first visualization is generated, and based on reflective characteristics of the set of constructs from which the second visualization is generated.

11. The method of claim 1, wherein the first visualization is more detailed and accurate than the second visualization as a result of a region of 3D space in the first visualization being generated from the plurality of values of two or more data points and a similar sized region of 3D space in the second visualization being generated from the singular set of values of a single construct.

12. A system comprising:
one or more processors configured to:
receive a point cloud comprising a plurality of data points that are distributed non-uniformly in three-dimensional ("3D") space to represent a 3D environment, each data point of the plurality of data points comprising a plurality of values that define (i) a particular position of the data point in the 3D space and (ii) descriptive characteristics that define properties of a surface, a feature, or an object of the 3D environment that is detected at that particular position;
determine a render position from which to render the 3D environment;
differentiate a first set of the plurality of data points from a second set of the plurality of data points based on the particular position of each data point relative to the render position;
generate a first visualization from the plurality of values of each individual data point of the first set of data points;
generate a second visualization from values of a set of constructs, wherein each construct of the set of constructs comprises a polygonal shape with a singular set of values defined from the plurality of values of two or more different data points from the second set of data points; and
present the 3D environment from the render position by combining the first visualization with the second visualization.

13. The system of claim 12, wherein the one or more processors are further configured to:
define the polygonal shape of a particular construct of the set of constructs to encompass a region spanned by a particular subset of two or more data points from the second set of data points; and
derive the singular set of values for the particular construct from the plurality of values of each data point from the particular subset of data points.

14. The system of claim 12, wherein differentiating the first set of data points from the second set of data points comprises:
determining that the plurality of values of each data point from the first set of data points satisfies criteria associated with the render position; and
determining that the plurality of values of each data point from the second set of data points does not satisfy the criteria.

15. The system of claim 12, wherein differentiating the first set of data points from the second set of data points comprises:
identifying the first set of data points as data points that are visible from the render position; and
identifying the second set of data points as data points that not visible from the render position.

16. The system of claim 12, wherein the one or more processors are further configured to:
determine a field-of-view of a camera set at the render position; and
wherein differentiating the first set of data points from the second set of data points comprises:
identifying the first set of data points with positions that are in the field-of-view and that are not wholly obscured from the render position by one or more data points; and
identifying the second set of data points with positions that are outside the field-of-view or that are wholly obscured from the render position by one or more data points.

17. The system of claim 12, wherein differentiating the first set of data points from the second set of data points comprises:
determining the first set of data points to be less than a specified distance from the render position; and
determining the second set of data points to be more than the specified distance from the render position.

18. The system of claim 12, wherein the one or more processors are further configured to:
detect a first subset of the second set of data points in which the particular position of each data point in the first subset of data points is no more than a specified distance from at least one other data point in the first subset of data points, and the descriptive characteristics of each data point in the first subset of data points have a first commonality;
detect a second subset of the second set of data points in which the particular position of each data point in the second subset of data points is no more than a specified distance from at least one other data point in the second subset of data points, and the descriptive characteristics of each data point in the second subset of data points have a second commonality that is different than the first commonality detected for the first subset of data points; and
define a first construct of the set of constructs as a substitute for the first subset of data points, and a second construct of the set of constructs as a substitute for the second subset of data points.

19. The system of claim 12, wherein the one or more processors are further configured to:
adjust lighting of the 3D environment from the render position based on reflective characteristics of the first set of data points from which the first visualization is generated, and based on reflective characteristics of the set of constructs from which the second visualization is generated.

20. A non-transitory computer-readable medium, storing a plurality of processor-executable instructions to:
receive a point cloud comprising a plurality of data points that are distributed non-uniformly in three-dimensional ("3D") space to represent a 3D environment, each data point of the plurality of data points comprising a plurality of values that define (i) a particular position of the data point in the 3D space and (ii) descriptive characteristics that define properties of a surface, a feature, or an object of the 3D environment that is detected at that particular position;

determine a render position from which to render the 3D environment;
differentiate a first set of the plurality of data points from a second set of the plurality of data points based on the particular position of each data point relative to the render position;
generate a first visualization from the plurality of values of each individual data point of the first set of data points;
generate a second visualization from values of a set of constructs, wherein each construct of the set of constructs comprises a polygonal shape with a singular set of values defined from the plurality of values of two or more different data points from the second set of data points; and
present the 3D environment from the render position by combining the first visualization with the second visualization.

* * * * *